United States Patent [19]
Minelli et al.

[11] Patent Number: 6,129,321
[45] Date of Patent: Oct. 10, 2000

[54] MOUNTING APPARATUS FOR AN ELECTRONIC DEVICE

[75] Inventors: Jeffrey D. Minelli, Olathe; David Laverick, Overland Park, both of Kans.

[73] Assignee: Garmin Corporation, Taiwan

[21] Appl. No.: 09/192,919

[22] Filed: Nov. 16, 1998

[51] Int. Cl.[7] .................................................. F16M 11/12
[52] U.S. Cl. ................................. 248/183.1; 248/183.2; 248/183.3; 248/186.2; 248/415; 248/920; 248/923
[58] Field of Search ............................. 248/183.1, 183.2, 248/183.3, 186.2, 415, 920, 923

[56] References Cited

U.S. PATENT DOCUMENTS

| | | | |
|---|---|---|---|
| D. 312,650 | 12/1990 | Charrier | 248/346 |
| 3,126,191 | 3/1964 | Holden | 248/286.1 |
| 3,312,436 | 4/1967 | Beghetto, Jr. | 248/148 |
| 4,162,696 | 7/1979 | Sprung | 150/52 |
| 4,889,302 | 12/1989 | Tucker | 248/128 |
| 5,103,377 | 4/1992 | Kobayashi et al. | 361/394 |
| 5,139,223 | 8/1992 | Sedighzabeh | 248/324 |
| 5,204,817 | 4/1993 | Yoshida | 364/449 |
| 5,226,622 | 7/1993 | Lee Anna | 248/183 |
| 5,288,237 | 2/1994 | Mizutani et al. | 439/76 |
| 5,326,059 | 7/1994 | Pryor et al. | 248/231.7 |
| 5,339,222 | 8/1994 | Simmons et al. | 361/818 |
| 5,350,147 | 9/1994 | Paganus | 248/346 |
| 5,476,241 | 12/1995 | Helman | 248/286.1 |
| 5,881,985 | 3/1999 | Hoenig | 248/923 X |

*Primary Examiner*—Anita M. King
*Assistant Examiner*—A. Joseph Wujciak
*Attorney, Agent, or Firm*—Shook, Hardy & Bacon L.L.P.

[57] ABSTRACT

An apparatus is provided for removably mounting an electronic device to a surface where such mounting can be accomplished using only one hand. The apparatus includes a mounting bracket that is securable to the electronic device. The bracket has a mounting pedestal coupled to it which has a lower ratchet surface. The apparatus further has a base which has a lower face that can be coupled to the surface, and an upper face which has a receiving slot for the pedestal. The slot has a shoulder extending thereabove to engage the pedestal, and an open end that allows the pedestal to be moved within the slot. The base further includes a releasable locking arm which has a retaining ridge located in line with the open end of the slot to selectively hold the pedestal within the slot. The locking arm has an upper pawl surface located to engage the ratchet surface when the pedestal is located within the slot. The ratchet and pawl surface provide a mechanism to hold the mounting bracket and the electronic device in a desired rotational position. The pedestal can thus be placed within the slot and held within the slot by the retaining ridge of the locking arm, and the mounting bracket can be rotated with respect to the base by rotating the pedestal within the slot. The pawl surface and ratchet surface cooperate to hold the electronic device in the desired position.

19 Claims, 5 Drawing Sheets

MOUNTING APPARATUS FOR AN ELECTRONIC DEVICE

BACKGROUND OF THE INVENTION

The present invention relates to a mounting apparatus for an electronic device. More specifically, the invention relates to a mounting apparatus for an electronic device for use in a vehicle which allows the electronic device to be selectively rotated or pivoted in two directions, and which allows the electronic device to be placed within, and removed from, a mounted position with one hand.

Electronic devices are being used more and more frequently in vehicles. For example, global positioning satellite devices are currently being used in vehicles and elsewhere. These devices are used for navigational purposes and are either permanently installed in a vehicle, or mounted so as to be portable. The portable device is advantageous in that it can be taken from the vehicle and used outside of the vehicle, thus adding value to the device.

The mounting of portable devices within vehicles does, however, present a number of disadvantages. First, it is more difficult to mount a portable device in a location within the vehicle that is easily viewed. Devices that are permanently installed in the vehicle can be mounted within the dashboard of the vehicle, easily within sight of the vehicle driver or passenger. Portable devices must, however, be mounted somewhere within the interior of the vehicle, such as on top of the dashboard. Viewing the screen of a portable electronic device mounted in a vehicle can be hampered if the angle of the viewing screen is fixed relative to the surface on which the device is mounted. A fixed viewing angle may limit the vehicles on which the device can be effectively mounted due to varying dashboard configurations as well as varying driver and passenger heights. Second, these electronic devices are often under-utilized if they are only viewable by the driver of the vehicle, but not passengers riding therein. Often the passenger in the vehicle is acting as the navigator. In these situations, it would be advantageous for the passenger to be able to view the global positioning satellite device.

As may be appreciated, it would also be advantageous to be able to place the electronic device into a mounted position using only one hand. Similarly, it would be advantageous to remove the electronic device from a mounted position using only one hand.

Therefore, a mounting apparatus is needed that can be used to mount a portable electronic device within a vehicle so that the device can be easily viewed and adjusted. Further, a mounting apparatus is needed that allows an electronic device to be mounted within a vehicle so that it is viewable by either the driver and the passenger riding therein. Still further, a mounting apparatus is needed that allows an electronic device to be mounted within, and removed from, a mounted position using only one hand.

SUMMARY OF THE INVENTION

It is an object of the present invention to provide a mounting apparatus for an electronic device within a vehicle so that the device can be easily viewed and adjusted.

It is a further object of this invention to provide a mounting apparatus that allows either the driver or the passenger of a vehicle in which the device is mounted to view the device.

It is still another object of the present invention to provide a mounting apparatus for an electronic device that allows the electronic device to be mounted within, and removed from, a mounted position using only one hand.

According to the present invention, the foregoing and other objects are obtained by an apparatus for removably mounting an electronic device to a surface. The apparatus includes a mounting bracket that is securable to the electronic device. The bracket has a mounting pedestal coupled to it which has a lower ratchet surface. The apparatus further has a base which has a lower face that can be coupled to the surface, and an upper face which has a receiving slot for the pedestal. The slot has a shoulder extending thereabove to engage the pedestal, and an open end that allows the pedestal to be moved within the slot. The base further includes a releasable locking arm which has a retaining ridge located in line with the open end of the slot to selectively hold the pedestal within the slot. The locking arm has an upper pawl surface located to engage the ratchet surface when the pedestal is located within the slot. The ratchet and pawl surface provide a mechanism to hold the mounting bracket and the electronic device in a desired rotational position. The pedestal can thus be placed within the slot and held within the slot by the retaining ridge of the locking arm, and the mounting bracket can be rotated with respect to the base by rotating the pedestal within the slot. The pawl surface and ratchet surface cooperate to hold the electronic device in the desired position.

Additional objects, advantages, and novel features of the invention will be set forth in part in the description which follows, and in part will become apparent to those skilled in the practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

In the accompanying drawings which form a part of the specification and which are to be read in conjunction therewith and in which like reference numerals are used to indicate like parts in the various views.

DETAILED DESCRIPTION OF THE INVENTION

Referring initially to FIGS. 1 through 5, a mounting apparatus embodying the principles of this invention is broadly designated in the drawings by reference numeral 10. Apparatus 10 is used to hold an electronic device 12 on a surface, such as a vehicle dashboard. Electronic device 12 can be, for example, a global positioning satellite device. Such a device normally includes some type of viewing screen, which visually conveys information to the user of the device. Apparatus 10 includes a base 14 and a mounting bracket 16. As described below, base 14 is coupled to the desired surface and is used to releasably hold mounting bracket 16. Bracket 16 is coupled to the electronic device and is constructed to be releasably held within base 14.

Figure 11:
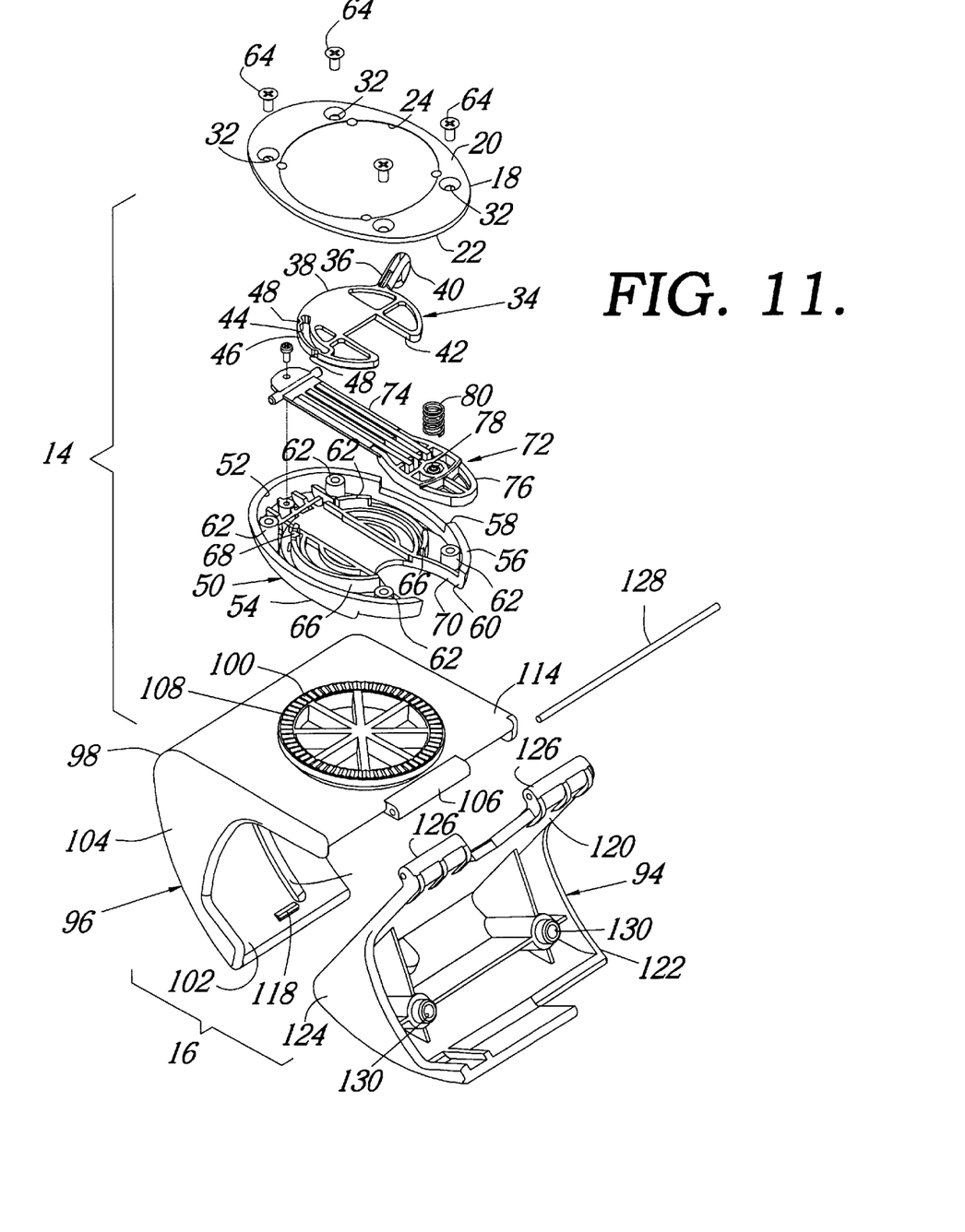
FIG. 11 is an exploded view of the apparatus.

As best seen in FIG. 11, base 14 has a lower section 18 with an exterior surface 20 and an interior surface 22. Exterior surface 20 has an inset 24 formed therein, which is used to attach exterior surface 20 to the desired surface, such as a vehicle dashboard. In use, an adhesive material may be applied within inset 24, which can then be placed on the desired surface. Alternatively, a suitable adhesive putty may be used to attach base 14 to the desired surface, with inset 24 controlling the location of the putty. Interior surface 22 has a plurality of bearing rings that extend upwardly from interior surface 22. Preferably, three raised, concentric bearing rings are formed on surface 22. Located near the periphery of inset 24 are a plurality of holes 32, which extend from exterior surface to interior surface 22.

Figure 9:
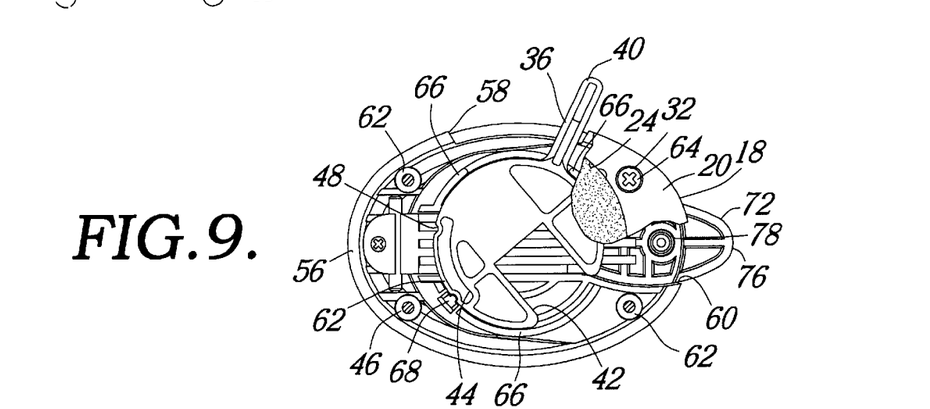
FIG. 9 is a bottom view of the base of FIG. 8, with parts being broken away to show particular details of construction.
Figure 10:
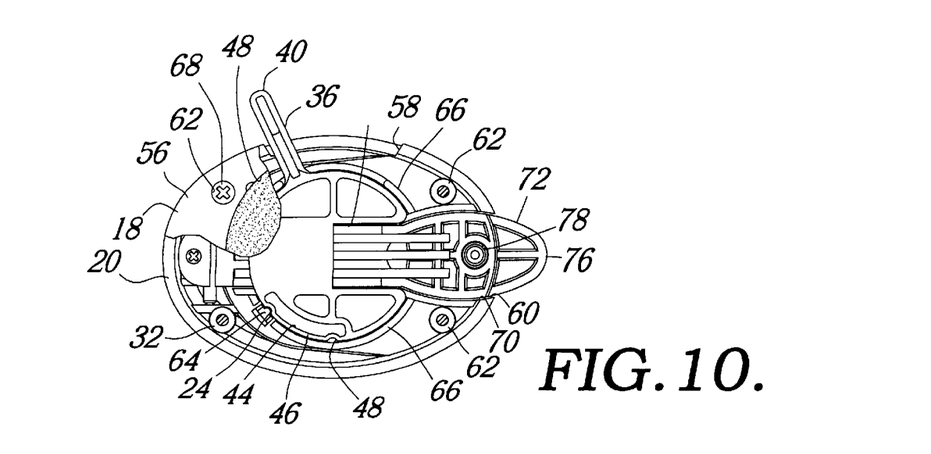
FIG. 10 is a view similar to FIG. 9, showing the locking arm in a different position.

A locking tab 34 rests upon the bearing rings of interior surface 22. Tab 34 has an outwardly extending handle 36 that is connected to an operative key section 38. Preferably, handle 36 and key section 38 are integrally formed from one piece. Handle 36 may be equipped with an enlarged head 40 for easier grasping by the user thereof. Key section 38 has a u-shaped slot 42 formed therein which is used to either prevent or allow bracket 16 to be removed from base 14, as is more fully described below. Located about one portion of the outer perimeter of key section 38 is an arcuate slot 44. As best seen in FIGS. 9–11, the outermost wall 46 defining slot 44 is relatively thin and has a depression 48 formed in each end thereof.

Figure 8:
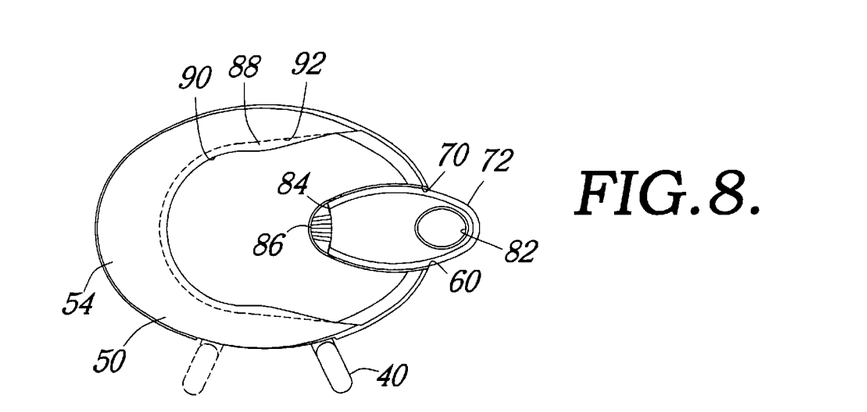
FIG. 8 is a top elevation view of the base of the apparatus, with a different position of the locking arm shown in phantom lines.

Locking tab 34 is placed and held between lower section 18 and an upper section 50. As best seen in FIGS. 8 and 11, upper section 50 has an interior portion 52 and an exterior portion 54. Interior portion 52 is defined by an outer wall 56 that extends downwardly from exterior portion 54. Outer wall 56 has a first gap 58 and a second gap 60 formed therein. First gap 58 allows clearance for handle 36 of locking tab 34, and allows clearance for rotational movement of handle 36 about an axis in the center of key section 38. Second gap 60 allows clearance for a locking arm, as is more fully described below. Located inwardly from wall 56 are a number of threaded columns 62. The number of columns 62 is equal to the number of holes 32. Holes 32 and columns 62 are located so as to be in alignment. As best seen in FIG. 11, once in alignment, with all of the other components of base 14 in place, a screw 64 is placed through each hole 32 and is threaded into each column 62, thereby securing lower section 18 to upper section 50.

Located inwardly from columns 62 is a series of arcuate retaining walls 66. As best seen in FIG. 11, there are preferably three walls 66, with one wall being longer than the other two. Walls 66 are located to form a perimeter that is slightly larger that the outer perimeter of key section 38, and act to retain key section 38 within walls 66. The two shorter walls 66 are spaced from one another to allow clearance for handle 36, and to allow clearance for rotational movement of handle 36. Generally, the two shorter walls 66 are spaced a corresponding distance to match the size of first gap 58. The space between each of the shorter walls 66 and longer wall 66 allows clearance for a locking arm, as is more fully described below. As best seen in FIG. 9–11, longer wall 66 has a detent 68 formed therein. In use, as is more fully described below, detent 68 is located within one of the two depressions 48 to hold locking tab 34 in either an open or a closed position. Extending from exterior portion 54 through to interior portion 52 is a c-shaped cut-out 70. Cut-out 70 is generally located between one of the shorter walls 66 and the longer wall 66.

As best seen in FIGS. 9–11, a locking arm 72 is secured within interior portion 52 at a location distal from second gap 60. Arm 72 is secured to upper section 50 with a suitable attaching mechanism, such as a screw or rivet. Other suitable attaching mechanisms could be used, so long as one end of arm 72 is secured to upper section 50. Arm 72 has an elongated portion 74 and a button 76. Elongated portion 74 has a width that is slightly less than the width of slot 42 in key section 38, so that it may pass between slot 42 when slot 42 is in alignment with elongated portion 74. Button 76 is shaped to fit within cut-out 70 so that it may travel within the cut-out, and is sized to extend beyond the perimeter of upper section 50. As best seen in FIG. 11, button 76 is preferably generally oval in shape and has a spring chamber 78 formed in the bottom thereof. Chamber 78 is used to locate and retain a spring 80 between button 76 and lower section 18. Spring 80 operates to bias arm 72 upwardly, the importance of which is described below. As best seen in FIG. 8, on the upper surface of button 76, a hollow 82 is presented to assist the user in depressing arm 72. Also on the upper surface of button 76 is an arcuate retaining ridge 84 and a pawl surface 86. Both ridge and pawl surface 86 are distal from hollow 82. As best seen in FIG. 8, pawl surface 86 is a series of ridges, extending from ridge 84 to the end of button 76, and located below the upper-most surface of button 76. Ridge 84 is arcuate in shape and is formed by a vertical wall terminating at the upper-most surface of button 76.

Figure 6:
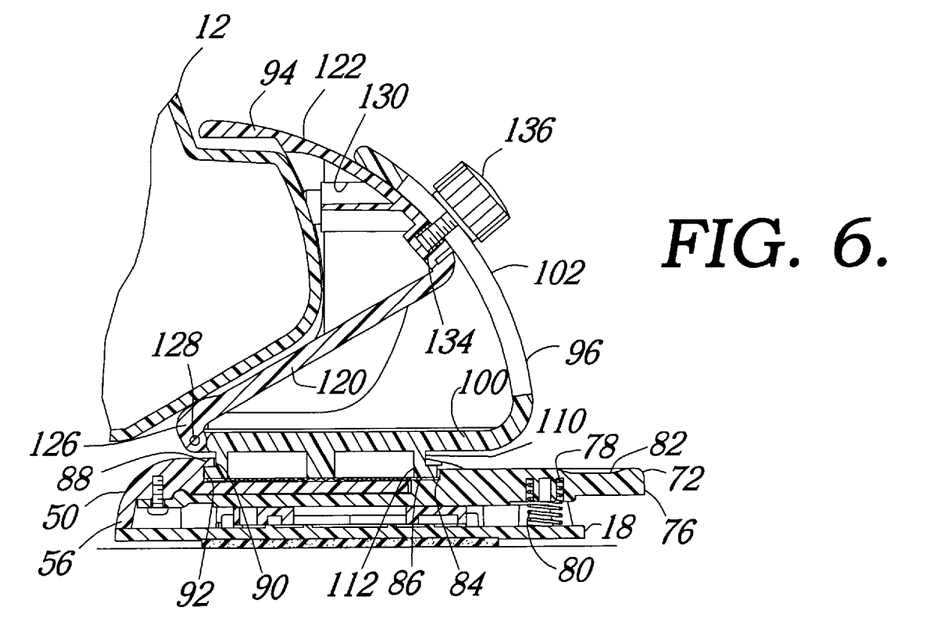
FIG. 6 is a partial cross-sectional view, taken along line 6—6 of FIG. 3.
Figure 7:
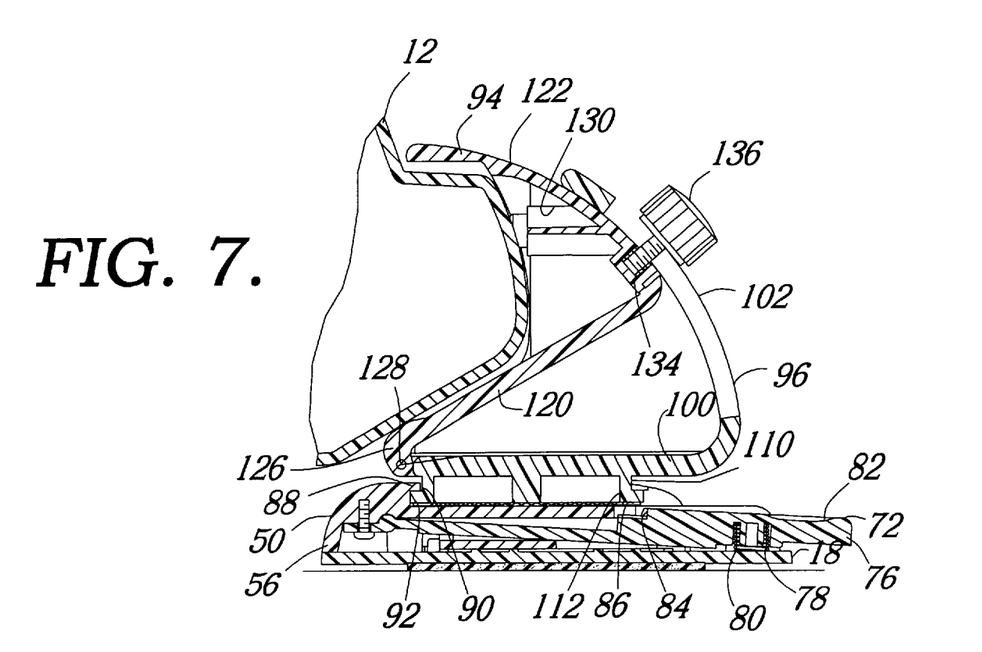
FIG. 7 is a view similar to FIG. 6, showing the locking arm in a depressed position.

As best seen in FIGS. 6–8, exterior portion 54 of upper section 50 includes an elevated shoulder 88 that defines a receiving slot 90. Slot 90 is generally c-shaped and has a generally semi-circular portion and an extending portion which is tapered outwardly. The outward taper is used to guide bracket 16 into place, as is more fully described below. As best seen in FIGS. 6 and 7, shoulder 88 extends outwardly over slot 90 and defines a receiving channel 92 that is shaped as is slot 90.

In assembling base 14, locking tab 34 is placed on the bearings rings of interior surface 22 and within arcuate retaining walls 66. Tab 34 is located such that detent 68 is within one of the depressions 48, with handle 36 protruding from upper section 50 through first gap 58. Locking arm 72 is secured to upper section 50 and spring 80 is placed within chamber 78 to bias arm 72 upwardly. Upper section 50 and lower section 18 are then secured together by placing screws 64 through holes 32 and threading them into columns 62. With this construction, handle 36 may be rotated between two positions, and held in one of the two positions by locating detent 68 within one of the two depressions 48. In one position, as shown in FIG. 10, slot 42 is placed in alignment with elongated portion 74 of arm 72. In this position, button 76 can be moved downwardly by depressing the button at hollow 82. Button 76 is allowed enough clearance to place retaining ridge 84 below the adjacent surface of exterior portion 54, as shown in FIG. 7. In the other position, as shown in FIG. 9, slot 42 is oriented at an angle to elongated portion 74. In this position, button 76 is prevented from moving downwardly. If button 76 is pressed when locking tab 34 is in this position, elongated portion 74 is prevented from downward movement by key section 38, because slot 42 is not aligned with portion 74. In this position, retaining ridge 84 and pawl surface 86 are both positively held above the adjacent surface of exterior portion 54.

Base 14 is used to secure electronic device 12 in place on a surface, in cooperation with bracket 16. As best seen in FIGS. 2–7, bracket 16 includes a unit mount 94 and a base mount 96. Base mount 96 has an outer shell 98 that has a generally horizontal section 100 and an upwardly extending, arcuate section 102. Located between sections 102 and 100 is a pair of supporting side walls 104. As best seen in FIG. 11, horizontal section 100 has a pivot pin support 106 at its end furthest from section 102, which has a hole extending therethrough. Section 100 also has a pedestal 108 extending downwardly therefrom. As best seen in FIGS. 6 and 7, pedestal 108 has a neck 110 that is of smaller diameter than a circular platform 112, located directly below the neck. As shown in FIG. 11, platform 112 has a lower, ratchet surface 114. Surface 114 has a series of ridges that are formed to engage pawl surface 86 in an interlocking relationship. Preferably, surface 114 extends about the entire lower perimeter of platform 112.

Figure 1:
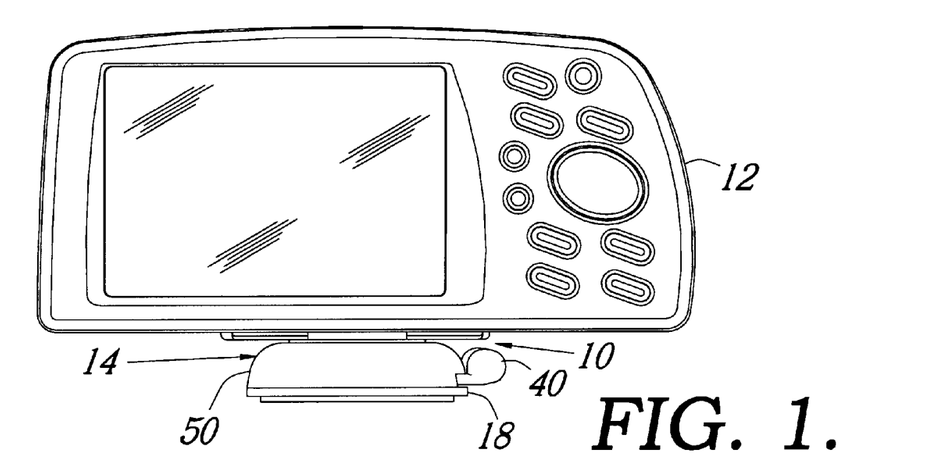
FIG. 1 is a front elevation view of a mounting apparatus embodying the principles of the present inventions with an electronic device mounted therein.
Figure 2:
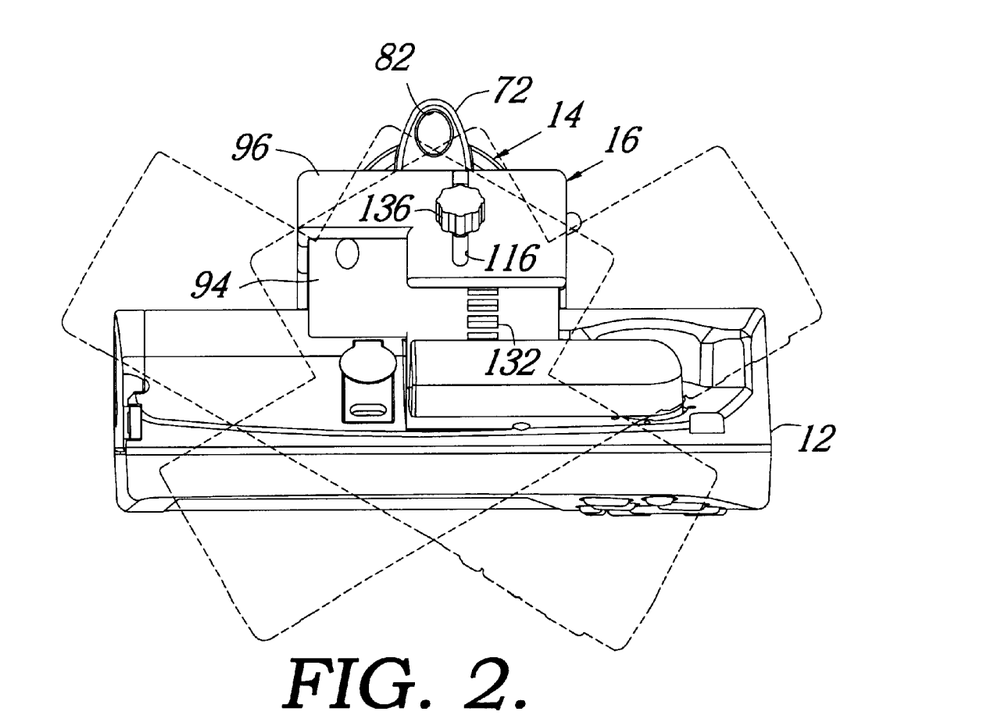
FIG. 2 is a top elevation view of the apparatus of FIG. 1, with different rotational orientations shown in phantom lines.
Figure 3:
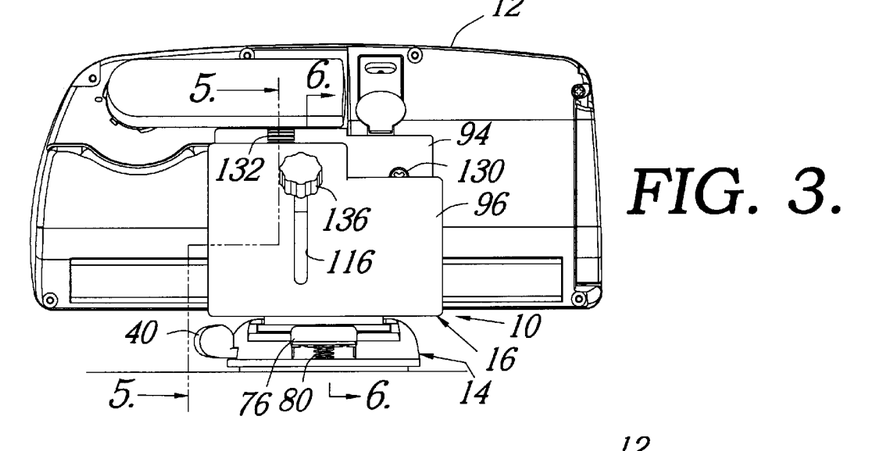
FIG. 3 is a rear elevation view of the apparatus of FIG. 1.
Figures 4, 5:
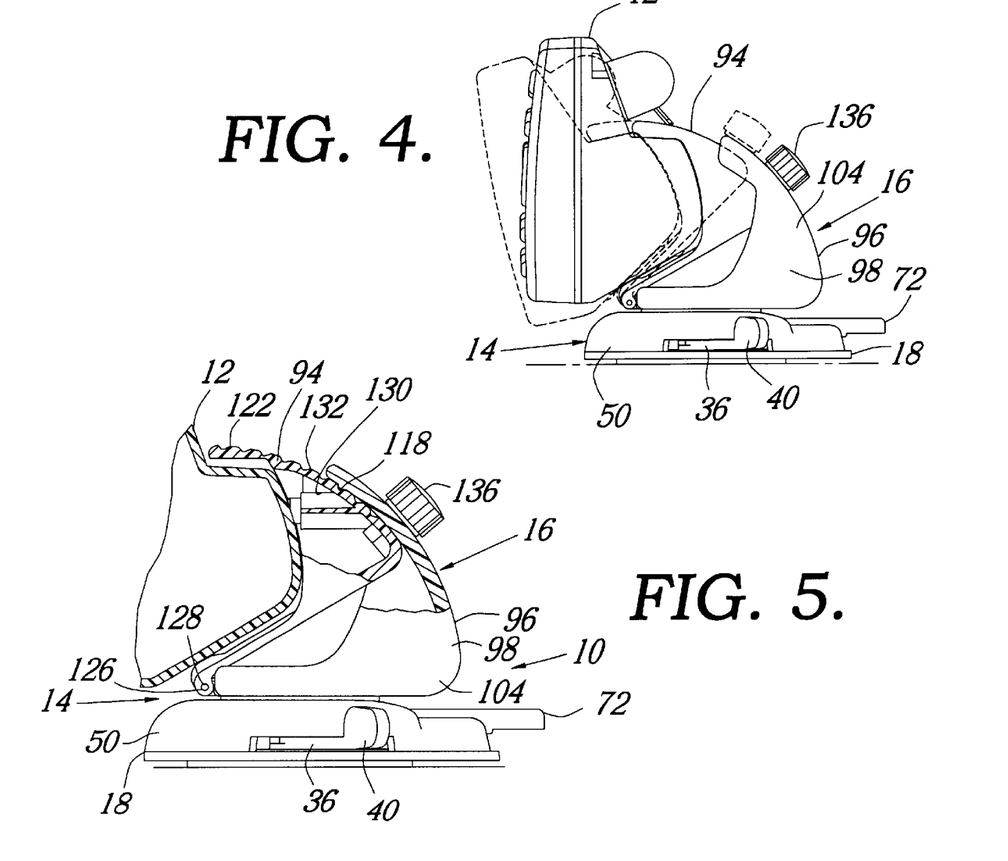
FIG. 4 is a side elevation view of the apparatus of FIG. 1, with different tilt angles shown in phantom lines.
FIG. 5 is a partial cross-sectional view, taken along line 5—5 of FIG. 3.

As best seen in FIGS. 2 and 3, arcuate section 102 has an elongated slot 116 formed therein that allows unit mount 94 to be pivoted within base mount 96, as is more fully described below. Slot 116 extends substantially the entire length of arcuate section 102. As best seen in FIGS. 5 and 11, located adjacent slot 116, near the upper end of section 102, and on the inside surface thereof, is a pawl 118. Pawl 118 is used to provide a number of discrete positions for unit mount 94 with respect to base mount 96.

As best shown in FIGS. 5–7 and 11, unit mount 94 has a horizontal section 120 and an arcuate section 122 that are supported by a pair of side walls 124. Sections 120, 122 and 124 are sized to nest within base mount 96, with arcuate section 122 sliding along section 102. Horizontal section 120 has a pair of pivot pin supports 126 that have a hole therethrough and that are spaced to fit matingly with pin support 106. Supports 126 are located distal from arcuate section 122, as best seen in FIGS. 6 and 7. Base mount 96 and unit mount 94 are pivotally coupled to one another by placing a pivot pin 128 through supports 106 and 126. Pin 128 thus holds base mount 96 and unit mount 94 together, but allows one to be pivoted with respect to the other.

At the lower end of arcuate section 122 are a pair of spaced holes 130, as best seen in FIG. 11. Holes 130 align with a pair of threaded holes on electronic device 12. Unit mount 94 is attached to device 12 by placing a screw through each hole 130 and threading it into the holes on device 12. As best seen in FIGS. 2 and 3, located adjacent one of the holes 130 on the surface of section 122 is an arcuate ratchet surface 132. Surface 132 is located to align with pawl 118 of base mount 96, as shown in FIG. 5. Surface 132 has a number of spaced ridges that are sized and spaced to create a number of valleys within which pawl 118 can selectively nest. Further, surface 132 extends substantially the entire length of arcuate section 122. As seen in FIGS. 6 and 7, adjacent surface 132, at the lower end thereof is a threaded hole 134. Hole 134 is located to align with slot 116 of base mount 96. Once unit mount 94, and device 12, are located as desired with respect to base mount 96, a threaded knob 136 is placed through slot 116 and is threaded into hole 134. Knob 136 thus prevents unit mount 94 from moving with respect to base mount 96.

In use, bracket 16 is secured to electronic device 12 by placing screws through holes 130 on unit mount 94 and threading them into the shell of device 12. The base 14 is then secured to the desired surface, such as a vehicle dashboard, by exposing an adhesive in the area of inset 24, or by placing an adhesive putty in the area of inset 24. To mount device 12 within base 14, locking tab 34 is moved to an open position shown in FIG. 10, such that slot 42 is aligned with elongated portion 74 of locking arm 72. Pedestal 108 is then located within the base. More specifically, platform 112 is guided within receiving channel 92, with neck 110 being guided along slot 90. Because locking tab 34 is in the open position, locking arm 72 is free to move downwardly. Thus, as platform 112 is placed on the upper surface of exterior portion 54, it can depress locking arm 72 and platform 112 can be moved into channel 92. This operation can be performed by a user utilizing only one hand, thus making installation of device 12 within base 14 easy and convenient.

When platform 112 is moved completely within channel 92, its outer perimeter will clear button 76 up to retaining ridge 84. Spring 80 will then act to move locking arm 72 upwardly to the position shown in FIG. 6, and pawl surface 86 will be placed in engagement with ratchet surface 114 of base mount 96. Retaining ridge 84 will then be in engagement with the outer perimeter of platform 112. In this orientation, base mount 96 and device 12 are prevented from moving beyond base 14 by retaining ridge 84. In order to remove device 12 from base 14, button 76 of locking arm 72 must be depressed to the position shown in FIG. 7 to release retaining ridge 84 from engagement with platform 112. In this position, device 12 can be removed from base 14 using only one hand.

Further, in this orientation, device 12 can be rotated with respect to base 14. In this rotation, enough rotational force must be applied to overcome the spring force acting upwardly on pawl surface 86. Device 12 may be placed in any of a number of discrete rotational locations, such as those shown in phantom lines in FIG. 2, as pawl surface 86 is located along lower ratchet surface 114. This rotational movement allows device 12 to be positioned for the driver or passenger of the vehicle, as desired.

Once device 12 has been rotated to the desired location, locking tab 34 can be rotated to a closed position. In this position, shown in FIG. 9, slot 42 is not aligned with elongated portion 74 of locking arm 72. Therefore, in this position, pawl surface 86 is positively held against ratchet surface 114. The engagement of pawl surface 86 and ratchet surface 114 prevents further rotation of device 12 with respect to base 14. Further, in this position, retaining ridge 84 is positively held against platform 112, holding device 12 within base 14.

Device 12 can also be pivoted upwardly and downwardly through bracket 16. More specifically, if it is desired to pivot device 12, knob 136 can be loosened. This allows unit mount 94 to be pivoted within base mount 96. Such pivoting may be necessary, for example, depending on the slope of a vehicle's dashboard. As unit mount 94, and thus device 12, is pivoted, pawl 118 is moved along ratchet surface 132. Once in the desired orientation, pawl 118 can be secured within ratchet surface 132 by tightening knob 136. From the above movements, the viewing screen of device 12 can be optimally positioned for viewing by the user thereof. Apparatus 10 allows the device to be repositioned into a number of different orientations to optimize this viewing and allows the device to be secured in this desired orientation. Moreover, apparatus 10 allows the device to be quickly and easily removed from base 14 using only one hand and therefore maintains the portability of device 12. Still further, device 12 maintains portability, while allowing it to be mounted within a vehicle for optimal viewing. The ratchet mechanisms for both rotational movement and pivoting movement provide a positive feel when repositioning device 12 within base 14.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. An apparatus for removably mounting an electronic device to a surface, comprising:
    a mounting bracket securable to the electronic device, said bracket having a mounting pedestal coupled thereto, said mounting bracket adapted to provide pivotable movement of the electronic device about a horizontal axis; and
    a base having a receiving slot for said pedestal, said base having a lower face that can be coupled to the surface and an upper face having said slot formed therein, said slot having an upper retaining edge being defined by a shoulder adapted to engage said pedestal to prevent said pedestal from upward movement relative to said base, said bracket being adapted to be pivotable within said slot about a vertical axis.

2. The apparatus of claim 1, wherein said slot has an open end to allow said pedestal to be moved within said slot.

3. The apparatus of claim 2, further including a releasable locking arm pivotally coupled to said base, said arm having a retaining ridge located in line with said open end of said slot, said ridge selectively holding said pedestal within said slot.

4. The apparatus of claim 3, wherein said pedestal has a lower ratchet surface and said locking arm has an upper pawl surface located to engage said ratchet surface when said pedestal is located within said slot, said ratchet and pawl surface providing a mechanism to hold said mounting bracket and the electronic device in a desired rotational position.

5. The apparatus of claim 4, further comprising a locking tab held between said upper face and said lower face of said base, said locking tab being rotatable between a first position that prevents disengagement of said pawl surface and said ratchet surface and a second position that allows disengagement of said pawl surface and said ratchet surface.

6. An apparatus for removably mounting an electronic device to a surface, comprising:
    a mounting bracket securable to the electronic device, said bracket having a mounting pedestal coupled thereto; and
    a base having a lower face that can be coupled to the surface and an upper face having a receiving slot for said pedestal, said slot having a shoulder extending thereabove to engage said pedestal and an open end to allow said pedestal to be moved within said slot, said base further including a releasable locking arm having a retaining ridge located in line with said open end of said slot to selectively hold said pedestal within said slot,
    wherein said pedestal can be placed within said slot and held within said slot by said retaining ridge of said locking arm, and wherein said mounting bracket can be rotated with respect to said base by rotating said pedestal within said slot.

7. The apparatus of claim 6, wherein said pedestal has a lower ratchet surface and said locking arm has an upper pawl surface located to engage said ratchet surface when said pedestal is located within said slot, said ratchet and pawl surface providing a mechanism to hold said mounting bracket and the electronic device in a desired rotational position.

8. The apparatus of claim 7, further comprising a biasing mechanism to bias said locking arm upwardly so that said retaining ridge engages said pedestal and so that said pawl surface engages said ratchet surface.

9. The apparatus of claim 7, wherein said open end of said slot is tapered outwardly to guide said pedestal into said slot.

10. The apparatus of claim 9, further comprising a locking tab held between said upper face and said lower face of said base, said locking tab being rotatable between a first position that prevents disengagement of said pawl surface and said ratchet surface and a second position that allows disengagement of said pawl surface and said ratchet surface.

11. The apparatus of claim 10, wherein said mounting bracket includes a unit mount securable to the device and a base mount having said pedestal coupled thereto, said base mount being pivotally coupled to said unit mount.

12. The apparatus of claim 11, wherein said unit mount is shaped to nest within said base mount, and wherein said unit mount has an arcuate ratchet surface thereon and wherein said base mount has an extending pawl that engages said arcuate ratchet surface, so that said unit mount can be pivoted with respect to said base mount by moving said pawl along said arcuate ratchet surface.

13. The apparatus of claim 12, wherein said mounting bracket has a means for securing the location of said unit mount with respect to said base mount.

14. An apparatus for removably mounting a global positioning satellite device to a vehicle surface, comprising:
    a mounting bracket including a unit mount securable to the device and a base mount having a pedestal coupled thereto and extending therefrom, said base mount being pivotally coupled to said unit mount;
    a base having a lower face that can be coupled to the vehicle surface, and an upper face having a receiving slot for said pedestal, said slot having a shoulder extending thereabove to engage said pedestal and an open end to allow said pedestal to be moved within said slot; and
    releasable locking arm coupled to said base, said arm having a retaining ridge located in line with said open end of said slot and positioned to selectively hold said pedestal within said slot,
    wherein the device can be removably mounted to a vehicle surface with said pedestal placed within said slot and held within said slot by said retaining ridge of said locking arm, and wherein said mounting bracket can be rotated with respect to said base by rotating said pedestal within said slot.

15. The apparatus of claim 14, wherein said pedestal has a lower ratchet surface and said locking arm has an upper pawl surface located to engage said ratchet surface when said pedestal is located within said slot, said ratchet surface and pawl surface providing a mechanism to hold said mounting bracket and the electronic device in a desired rotational position.

16. The apparatus of claim 15, further comprising a biasing mechanism to bias said locking arm upwardly so that said retaining ridge engages said pedestal and so that said pawl surface engages said ratchet surface.

17. The apparatus of claim 16, further comprising a locking tab held between said upper face and said lower face of said base, said locking tab being rotatable between a first position that prevents disengagement of said pawl surface and said ratchet surface and a second position that allows disengagement of said pawl surface and said ratchet surface.

18. The apparatus of claim 17, wherein said unit mount is shaped to nest within said base mount, and wherein said unit mount has an arcuate ratchet surface thereon and wherein said base mount has an extending pawl that engages said arcuate ratchet surface, so that said unit mount can be pivoted with respect to said base mount by moving said pawl along said arcuate ratchet surface.

19. The apparatus of claim 18, wherein said mounting bracket has a means for securing the location of said unit mount with respect to said base mount.

* * * * *